United States Patent [19]
Petersen

[11] Patent Number: 5,608,742
[45] Date of Patent: Mar. 4, 1997

[54] DIODE PUMPED, FIBER COUPLED LASER WITH DEPOLARIZED PUMP BEAM

[75] Inventor: Alan B. Petersen, Palo Alto, Calif.

[73] Assignee: Spectra Physics Lasers, Inc., Mountain View, Calif.

[21] Appl. No.: 516,586

[22] Filed: Aug. 18, 1995

[51] Int. Cl.⁶ ..................................................... H01G 3/30
[52] U.S. Cl. .............................. 372/6; 372/27; 372/99; 372/75; 372/105; 372/107; 372/108
[58] Field of Search .................................. 372/92, 27, 19, 372/69, 75, 99, 71, 72, 97, 107, 108, 98, 105

[56] References Cited

U.S. PATENT DOCUMENTS

| | | | |
|---|---|---|---|
| 4,665,529 | 5/1987 | Baer et al. | 372/107 |
| 5,127,068 | 6/1992 | Baer et al. | 385/34 |
| 5,218,652 | 6/1993 | Lutz | 385/11 |
| 5,245,407 | 9/1993 | Nishiura et al. | 356/350 |
| 5,335,064 | 8/1994 | Nishiura et al. | 356/350 |
| 5,371,595 | 12/1994 | Nishiura et al. | 356/350 |
| 5,410,559 | 4/1995 | Nighan, Jr. et al. | 372/69 |
| 5,412,683 | 5/1995 | Nighan, Jr. et al. | 372/75 |
| 5,513,195 | 4/1996 | Opower et al. | 372/18 |

*Primary Examiner*—Leon Scott, Jr.
*Attorney, Agent, or Firm*—Wilson Sonsini Goodrich & Rosati

[57] ABSTRACT

A laser or laser amplifier apparatus has a diode pump source producing a polarized pump beam. A laser head includes a gain medium that produces an output beam. One or more optical fibers are coupled to the diode pump source and deliver the pump beam to the laser head. A depolarization device is coupled to the diode pump source, laser head or optical fiber and produces an depolarized pump beam. By depolarizing the output beam, movement, including rotation, of the pump source does not comprise the output beam produced from the laser head.

54 Claims, 6 Drawing Sheets

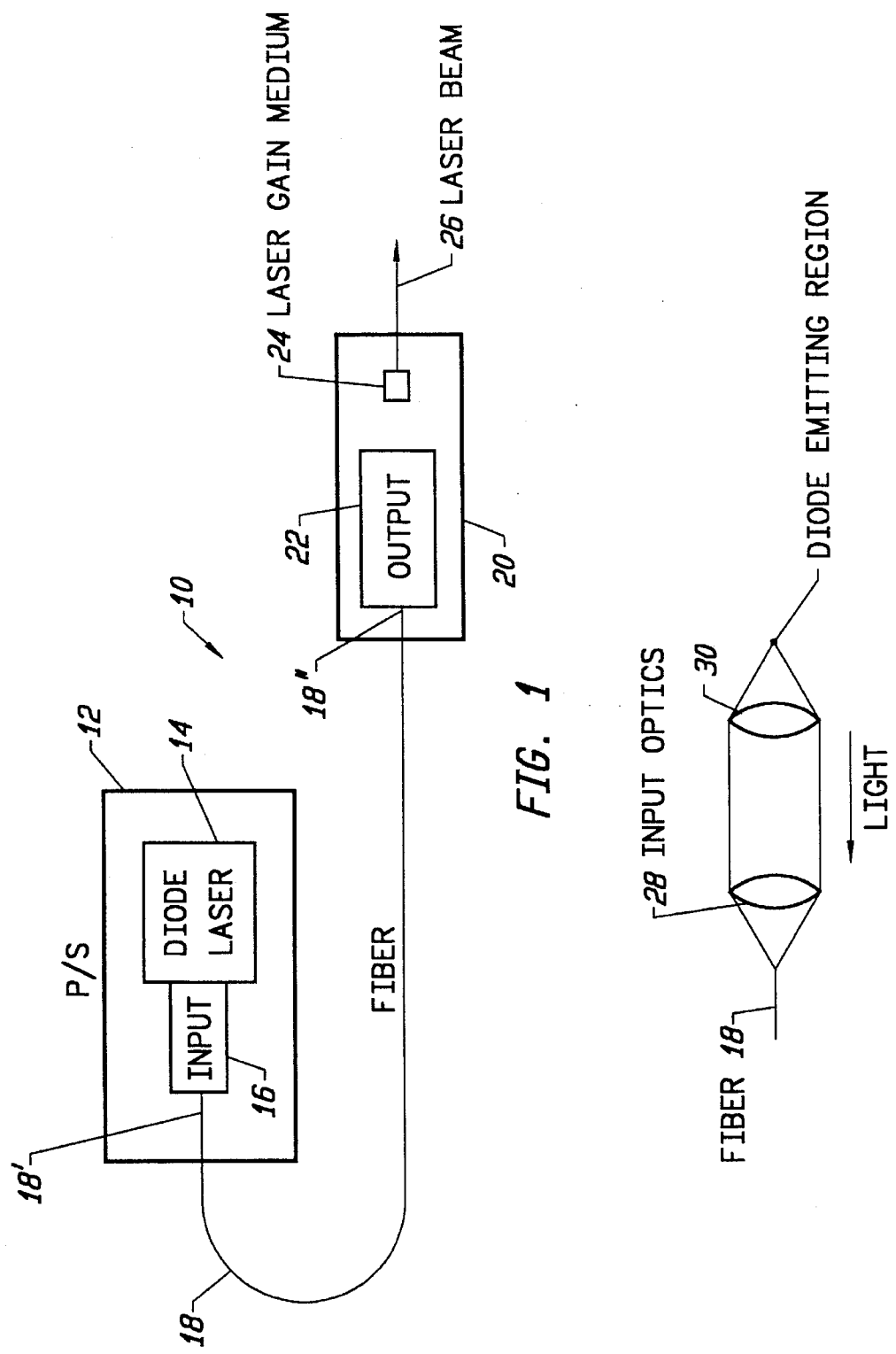

DIODE PUMPED, FIBER COUPLED LASER WITH DEPOLARIZED PUMP BEAM

BACKGROUND OF THE INVENTION

1. Field of the Invention

This invention relates generally to laser heads that are fiber coupled to laser diode pump sources, and more particularly to a laser or laser amplifier apparatus with a laser head that is fiber coupled to a diode source which produces a polarized pump beam, and includes a depolarization device or method which changes the polarized pump beam to a depolarized pump beam.

2. Description of Related Art

Laser systems with fiber coupling imaging are known. One such system includes a laser head coupled by an optical fiber or fiber bundle to a power supply which contains a laser diode pumping source suitable for pumping a solid state laser medium in the laser head. A pump beam is transmitted from the power supply to the laser head by the optical fiber. In many instances the image size from the fiber is matched to the mode size in the laser medium. The image size from the fiber is determined by the fiber diameter and divergence of the light from the fiber. The use of the fiber optic coupling allows the laser head to be compact and contain only the optical elements while all of the electronic and other elements, including the pumping source, can be placed in a separate, stationary power supply. Another advantage is that the cooling requirements of the head are minimized, allowing for high power, small air-cooled heads. Since the optical fiber can be long, this system configuration provides flexibility in the use of the laser, making the laser head portable. Further, different laser heads can be readily interchanged. Thus a variety of different laser heads which have different output characteristics can be used, essentially giving the user the benefit of several different systems but without the expense and redundance of entire separate systems because only a new laser head is required with the same power supply to have an entire new system.

Because the laser head contains only the optical components, the availability of different outputs becomes relatively economic. The down time in the case of a laser head failure is minimized since a replacement head can easily be substituted. Another advantage to the use of fiber optic coupling imagery for pumping the laser medium is that in the event the pump source must be replaced, the diode source can be replaced and matched into the fibers without the need for realignment of the laser head.

Diode pump sources typically produce a linearly polarized light output. Linear polarization is a condition in which the electric field vector associated with the light varies in amplitude at the light frequency, but is always oriented along one axis in space, in a plane perpendicular to the direction of light propagation. Passage of the light through subsequent optical elements can cause modification of this polarization. It may remain linear, but have a different direction within the perpendicular plane. The polarization may become circular, in which the vector amplitude remains constant, but its direction rotates at the light frequency, within this plane. More generally, the polarization can become elliptical, in which both the amplitude and direction of the electric vector vary within the perpendicular plane, at the light frequency, but with an arbitrary phase relationship.

Polarization is typically measured with a linear polarization analyzer, which measures the dominant direction of the polarization and the degree to which it approaches the ideal linear case. Results are frequently quoted as the angle of the dominant direction and the "extinction ratio", the ratio of power transmission through the analyzer with it oriented in the dominant direction and orthogonal to that direction. Perfect linear polarization would have an infinite extinction ratio, while perfect circular or perfectly random polarization would have a ratio of 1:1 and no dominant orientation. The general elliptical case would have a dominant direction and an intermediate extinction value.

Multimode optical fibers or fiber bundles, such as are commonly used in diode-pumped, fiber-coupled laser systems, are often viewed as "light pipes", which maintain the optical frequency and intensity of the light they transmit, but degrade its spacial and phase coherence. In particular, it was previously assumed that polarization of the input light would not be preserved at the output. However, it has been observed that in a short optical fiber or bundle, as is typically used in a fiber-coupled laser system, a significant amount of the input polarization character is preserved. For instance, linearly-polarized diode laser pump light, with an extinction ratio of perhaps 500:1 can, when passed through a short length of optical fiber, still exhibit extinction ratios of 3:1. However, the exact direction of polarization and extinction ratio vary among fibers and depend on the physical conditions surrounding the fiber. In particular, the output polarization varies with fiber position.

Pump light absorption characteristics in a solid state laser gain medium are often anisotropic, in other words, depend on the nature of the pump light polarization. Therefore, changes in this polarization can affect performance of the solid state laser. Based on the previous discussion, it should be clear that detailed performance of the laser can depend on the relative position of the power supply, fiber and laser head, and the particular fiber being used. This is a disadvantage when constant laser performance is desired when changing system components or repositioning the system.

To overcome this problem, pump light must be incident on the laser gain medium with a polarization state that is insensitive to laser system reconfiguration. This can be achieved if the pump light is completely depolarized, e.g., has no preferred orientation. Depolarization of the pump light can be accomplished between the laser diode and the fiber input along the fiber, or between the fiber output and the laser gain medium.

It would be desirable to provide a diode pumped, fiber coupled system that is insensitive to the movement of components of the system. It would be further desirable to provide a diode pumped, fiber coupled system which delivers an unpolarized pump beam to the laser gain medium.

SUMMARY OF THE INVENTION

Accordingly, it is an object of the invention to provide a laser or laser amplifier apparatus that is diode pumped, fiber coupled to a diode pump source and insensitive to the physical configuration of individual components of the apparatus.

Another object of the invention is to provide a laser or laser amplifier apparatus that is diode pumped and optically coupled, and delivers a depolarized pump beam to the laser gain medium.

A further object of the invention is to provide a diode laser with a polarized pump beam and a depolarizer in order to deliver a depolarizered pump beam to a laser gain medium.

Yet another object of the invention is to provide a fiber coupled laser or laser amplifier apparatus which can include a variety of depolarization devices.

Another object of the invention is to provide a fiber coupled laser or laser amplifier apparatus that positions a depolarizer device between a diode pump source and an input of a fiber or fiber bundle.

Still another object of the invention is to provide a fiber coupled laser or laser amplifier apparatus that positions a depolarizer device intermediate between an output end of an optical fiber and a pump face of a laser gain medium.

A further object of the invention is to provide a fiber coupled laser or laser amplifier apparatus that includes two diode pump sources each producing an independent orthogonally polarized pump beam, and a combining device which combines the polarized pump beams into a single optical fiber.

Yet another object of the invention is to provide a fiber coupled laser or laser amplifier apparatus that is fiber coupled to a diode pump source with at least two diode sources each producing a polarized pump beam, and each pump beam is coupled into a multifurbricated fiber or fiber bundle.

Another object of the invention is to provide a fiber coupled laser or laser amplifier apparatus which is fiber coupled to a diode pump source that produces a polarized pump beam, and the fiber changes the polarized pump beam to a depolarized pump beam.

These and other objects of the invention are achieved in a laser or laser amplifier apparatus with a diode pump source producing a polarized pump beam. The apparatus includes a laser head with a gain medium pumped by a depolarized pump beam to generate an output beam. One of an optical fiber or bundle is coupled to the diode pump source and delivers the pump beam to the laser head.

In another embodiment, the laser or laser amplifier includes a depolarization device coupled to one of the diode pump source, laser head or optical fiber or bundle, and produces a depolarized pump beam.

In yet another embodiment, the laser or laser amplifier apparatus has a diode pump source that produces a polarized pump beam. A laser head includes a gain medium that produces an output beam. One or more optical fibers are coupled to the diode pump source and delivering the pump beam to the laser head. The optical fiber or fibers have a geometry which changes the polarized pump beam to a depolarized pump beam.

There are numerous ways to achieve a depolarized pump beam, including but not limited to, (i) providing a diode pump source with at least two independent emitters that each produce pump beams of different polarizations along with a device that combines the polarized pump beams into a single optical fiber, (ii) providing two or more diode pump sources with each producing a polarized pump beam that is coupled into a multifurbricated fiber, (iii) positioning the depolarization device adjacent to an input end of the optical fiber, (iv) positioning the depolarization device adjacent to an output end of the optical fiber and (v) positioning the depolarization device along a length of the optical fiber.

The laser gain medium can be made of an anisotropic material. The optical fiber can comprise a fiber bundle, with each fiber optically coupled to an emitter region of the diode source. A variety of diode sources can be utilized including but not limited to diode bars, a single emitter or broad stripe emitters. Many depolarizers are suitable with the present invention. Additionally, a multifurbricated fiber combining multiple sources with different polarizations can be used.

BRIEF DESCRIPTION OF THE FIGURES

FIG. 1 is a perspective view of a laser head which is fiber coupled to a diode pump source.

FIG. 2 is a perspective view of the relationship between a fiber and input optics of the present invention.

DETAILED DESCRIPTION

Figure 3:
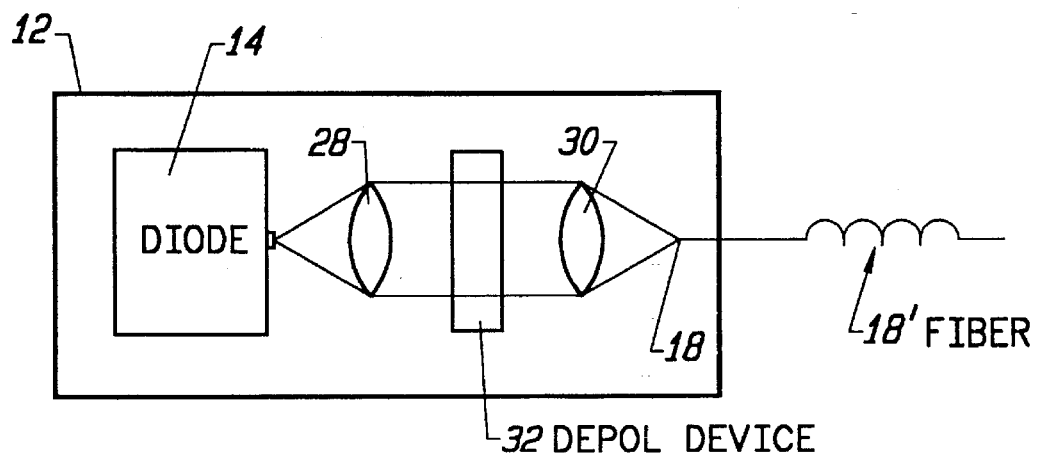
FIG. 3 is a perspective view of a depolarization device positioned between the diode pump source and the fiber or fiber bundle.

For purposes of this disclosure, the following definitions apply:

"Depolarized" shall mean a beam which when passed through a linear polarization analyzer, and incident on an optical power meter, shows no appreciable variation in transmitted power with analyzer azimuthal direction.

"Depolarizer" shall mean a device which converts a polarized beam to a depolarized beam.

"Diode source" shall mean a single diode with one emitter region, a spatial emitter, a diode bar or a plurality of diodes or diode bars and a broad stripe emitter. Diode source shall include optics for coupling the diode light into an optical fiber if such optics are not separately stated.

"Optical fiber" shall mean a single optical fiber or a plurality of optical fibers generally referred to as a fiber bundle.

"Multifurbricated fiber" shall mean two or more single optical fibers which are fused or combined together and continue as one single fiber.

"Multifurbricated bundle" shall mean a plurality of single fibers which are bunched closely together and terminate together at one end, and which along its length is divided into two or more smaller bundles, each of which terminates independently.

Referring now to FIG. 1, a laser or laser amplifier, generally denoted as 10, has a power supply 12, including a laser diode pump source 14, and one or more input optics 16. Laser diode pump source 14 is a model No. OPC-A020-797-CS, available from OptoPower Corporation, City of Industry, Calif. Preferred wavelengths of diode pump source 14 are in the range of 790 to 815 nm. Laser diode pump source 14 can be a plurality of diode sources each producing separate polarized output beams. Substantially equal power output means that the separate polarized output beams have power outputs that are different by no more than 10%, preferably no more than 5% and still more preferably no more than 2%. Substantially equal wavelengths means a difference in the center of the wavelengths of 1 nm or less. The combined output beams are then combined to produce a depolarized pump beam, as more fully described below. The present invention can be filed as disclosed in U.S. Pat. Nos. 4,665,529 and 5,127,068, incorporated herein by reference.

Input optics 16 include mirrors, lenses and combinations therefore, and focus a polarized output beam produced from laser diode pump source 14 to an input end 18' of optical fiber 18. Suitable optical fibers included. Optical fiber can have a length of ten meters or less, six meters or less or two meters or less.

An output end 18" of optical fiber 18 delivers the output beam to a laser head 20. Laser head 20 includes output optics 22 and a laser gain medium 24. A suitable laser gain medium 24 includes but is not limited to Nd:YLF, Nd:YAG, Nd:YVO$_4$, Nd:GVO$_4$, Nd:YPO$_4$, Nd:BEL, Nd:YALO and Nd:LSB. A preferred crystal material is Nd:YVO$_4$. Laser gain medium 24 can be an anisotropic material. Laser gain medium 24 receives the depolarized pump beam and produces an output beam 26. Wavelengths of specific laser gain mediums 24 are as follows: Tm:YAG—785 nm; Nd:YLF—793; and Nd:YAG, Nd:YVO$_4$—809 nm.

Referring now to FIG. 2, two optical elements, such as lenses 28 and 30 are arranged in a telescope configuration and define input optics 16 and output optics 22.

Input optics focus the pump beam to a desired size by lenses 28 and 30. The telescope arrangement provides for the focussing of the pump beam from laser diode pump source 14. The size of the pump beam is optimized with lenses 28 and 30 to avoid fracture of incident faces of laser gain medium 24 while increasing useful pump power, and may be mode-matched.

A beam shaping device can be included. Laser or laser amplifier 10 has a beam with a first beam quality factor $M_x^2$ in a first direction, and a second beam quality factor $M_y^2$ in an orthogonal direction. The beam shaping device includes at least one reflecting surface diverting at least a first part of the beam in order to reconfigure at least one of the first and second beam qualities $M_x^2$ and $M_y^2$. This beam shaping device provides more equal $M^2$ values in the two orthogonal directions to facilitate focusing of the diode laser beam into a small optical fiber 18.

Figure 4:
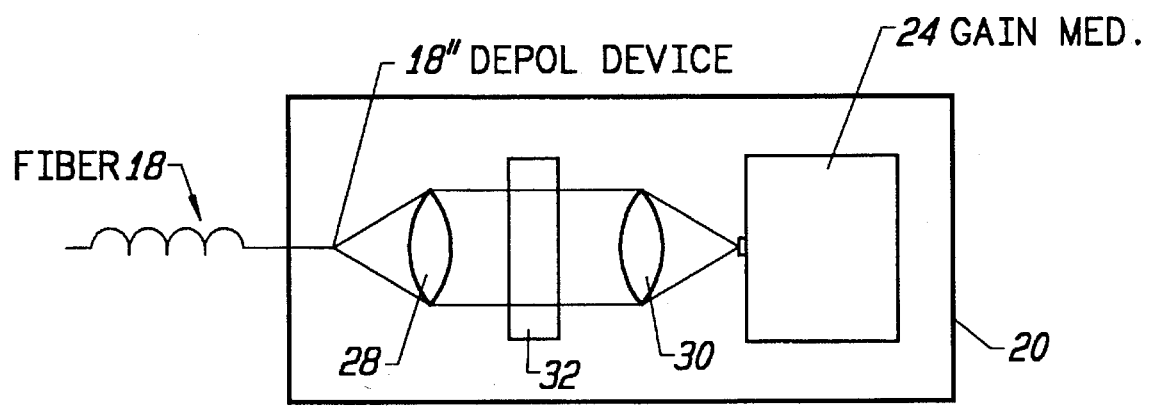
FIG. 4 is a perspective view of a depolarization device positioned between a telescope arrangement of optics located at the output end of a fiber or fiber bundle.

A depolarization device 32 can be included to modify the polarized pump beam to a depolarized pump beam. As shown in FIG. 3, depolarization device 32 is positioned between lenses 28 and 30 in power supply 12. In FIG. 4, depolarization device 32 is positioned in laser head 20 between lenses 28 and 30. It will be appreciated that depolarization device 32 need not be positioned between lenses 28 and 30 but can be placed adjacent to input end 18', output end 18" or adjacent to lens 28 or 30 outside of the telescoping arrangement. Additionally, depolarization device 32 can be positioned along a selected length of optical fiber 18.

Figure 5:
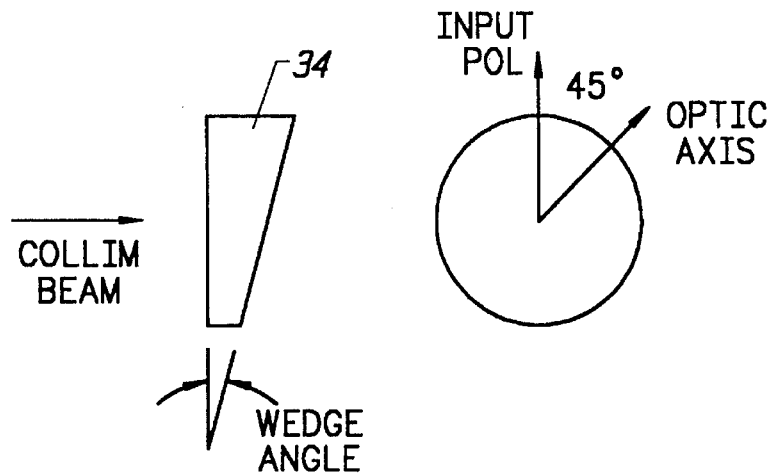
FIG. 5 is a perspective of a depolarization device which is a wedge made of a birefringent material that has an input polarization that is at 45 degrees relative to the wedge's optical axis.
Figure 6:
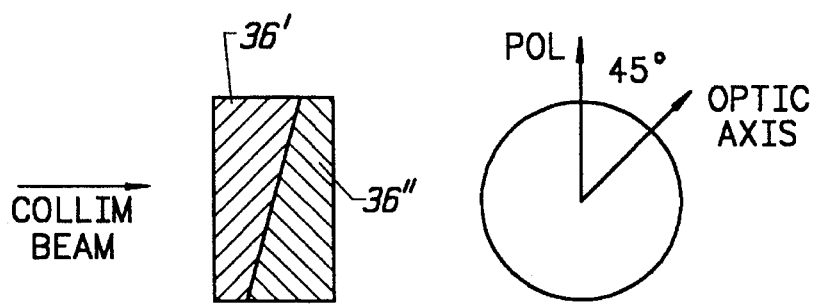
FIG. 6 is a perspective view of a wedge made of a birefringent material and a wedge made of anisotropic material, and the polarization of the input beam is 45 degrees relative to the optical axis.
Figure 7:
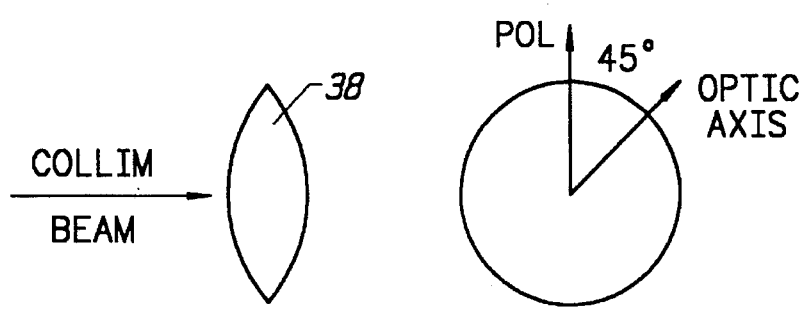
FIG. 7 illustrates a depolarization device which is a lens made from a birefringent material and the output beam has a polarization that is 45 degrees relative to the optical axis.
Figure 8:
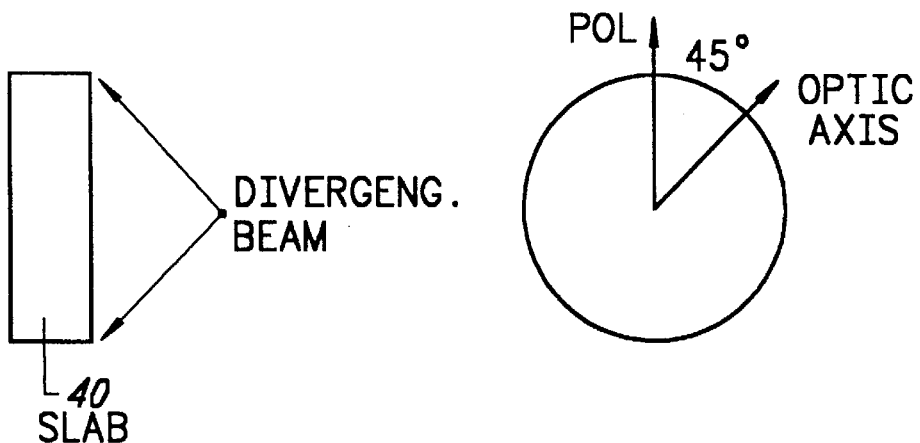
FIG. 8 is a perspective view of a polarization device that is a slab of birefringent material positioned in a diverging beam with a polarization that is 45 degrees relative to the optical axis.
Figure 9:
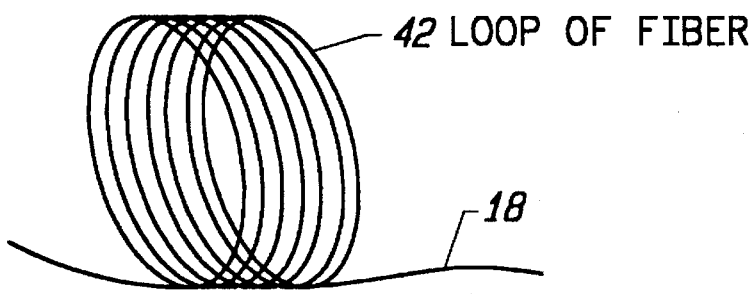
FIG. 9 illustrates a loop formed in a fiber of bundle.
Figure 10:
FIG. 10 illustrates an optical fiber or bundle which has a serpentine geometry along at least a portion of its length which depolarizes a polarized beam.
Figure 11:
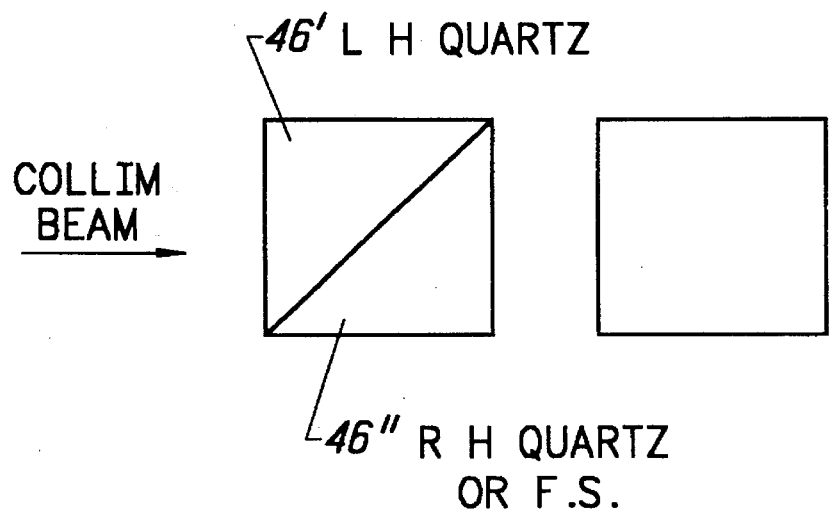
FIG. 11 illustrates a depolarization device which comprises a cube made of left hand quartz and right hand quartz.
Figure 12:
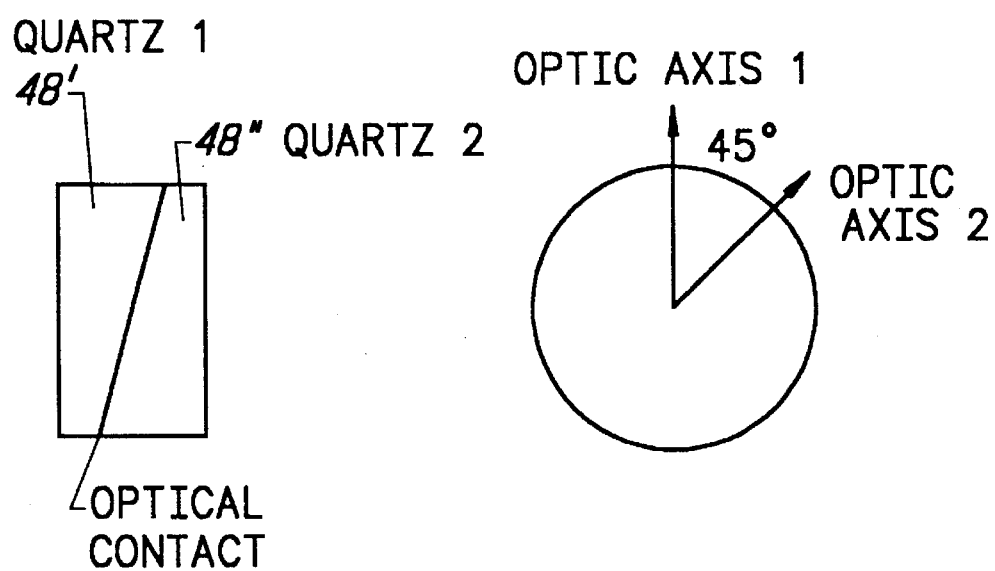
FIG. 12 illustrates a depolarization device which comprises two wedges of birefringent material, such as quartz, in a contacting relationship where the optical axis of the first wedge is 45 degrees relative to the optical axis of the second wedge.

A variety of depolarization devices 32 are suitable for use with the present invention, as illustrated in FIGS. 5 through 12. Depolarization device can be, (i) a wedge 34 made of a birefringent material that has in input polarization which is preferably 45 degrees relative to its optical axis (FIG. 5); (ii) a wedge 36' made of a birefringent material coupled to a wedge 36" comprising an isotropic material, where the polarization is preferably 45 degrees relative to the optical axis (FIG. 6); (iii) a lens 38 made from a birefringent material, where the polarization is preferably 45 degrees relative to the optical axis (FIG. 7); (iv) a slab 40 with a diverging beam, where the polarization is preferably 45 degrees to the optical axis (FIG. 8); (v) a section of optical fiber 18 with a loop geometry 42 (FIG. 9); (vi) a serpentine section 44 of fiber 18 (FIG. 10); a cube made of two prisms of optically active material; such as quartz. The first section made of left hand material 46' and a second section of right hand material 46", each with its optic axis along the beam path (FIG. 11); and first and second wedges 48' and 48" made of material and optically contacted, where an optic axis of wedge 48' is 45 degrees relative to an optic axis of wedge 48" (FIG. 12). The purpose of the preceding depolarization devices is to modify the linear polarization of an incident light beam in a manner which varies rapidly across the beam. Examples of depolarization devices are disclosed in Handbook of Optics, published by McGraw Hill, edited by Walter G. Driscoll, (1978); Melles-Griot Catalog, Section 14, pp. 26–27, (1994); Virgo Optics Catalog, p. 17, (1991), all incorporated herein by reference.

In fiber loop 42 of FIG. 9, transmitted light experiences a very large number of internal reflections and variable phase retardation due to local stress birefringence and the long interaction length. The result, is "scrambling" of the input polarization state and a randomly polarized output, regardless of the particular fiber 18 position. The length of fiber 18 required for adequate randomization may be many tens of meters. Serpentine 44 of FIG. 10, or other local fiber perturbation, is intended to achieve this same result with less length of fiber 18.

In the device of FIG. 11, optical activity in crystalline quartz 46 rotates the linear input polarization clockwise or counterclockwise, according to whether the quartz is right-handed or left-handed. Because the relative optical path length through the two types of quartz varies across the beam, the polarization orientation will vary across the beam. The more rapidly this orientation varies across the beam, the more complete is the depolarization. Even though any microscopic region of the beam is still well polarized, the sum of all the differently polarized regions will have virtually no preferred orientation. This is what is important in pumping the laser crystal.

The devices in FIGS. 5–8 also produce a varying polarization state across the beam, but do so by birefringent rotation rather than optical activity. In each case, the optical path length through the birefringent material varies across the beam width. For maximum depolarization the optical axis of the material and the input polarization should be at 45 degrees to each other. In this case, moving across the beam, linear polarization changes through elliptical, circular, elliptical, and then linear, orthogonal polarization. This cycle repeats itself across the beam. The greater the thickness gradient, the wider the beam and the larger the birefringence, the more cycles occur and the more effective is the depolarization.

The devices of FIGS. 5–8 provide most effective depolarization of a linearly polarized input beam if the optical axis of the birefringent material is at exactly 45 degrees to the input polarization. The degree of depolarization can often be quite sensitive to this angle. Precise alignment can be accomplished at the input end optical fiber 18, because the diode pump beam is well polarized there in a fixed direction. This is not possible at the output end of a short fiber 18, however, since the rotation and partial depolarization occurring in fiber 18 will change when the fiber is exchanged or the system components are moved. Some degree of motion sensitivity will remain when devices such as those in FIGS. 5–8 are used at the output end of a short fiber.

The device of FIG. 12 solves this problem. Since depolarization of the input beam is the sum of effects occurring in wedges 48' and 48", and the optical axis of wedges 48' and 48" are oriented at 45 degrees, at least one of the two parts will be very effective in depolarizing the input beam, regardless of its orientation. The device of FIG. 12 has the advantages of being compact, requiring no rotational alignment and being effective at either end of fiber 18.

The device of FIG. 11, employing optical activity, also requires no rotational alignment. It is also effective at either end of a short fiber, but is not as compact.

Figure 13:
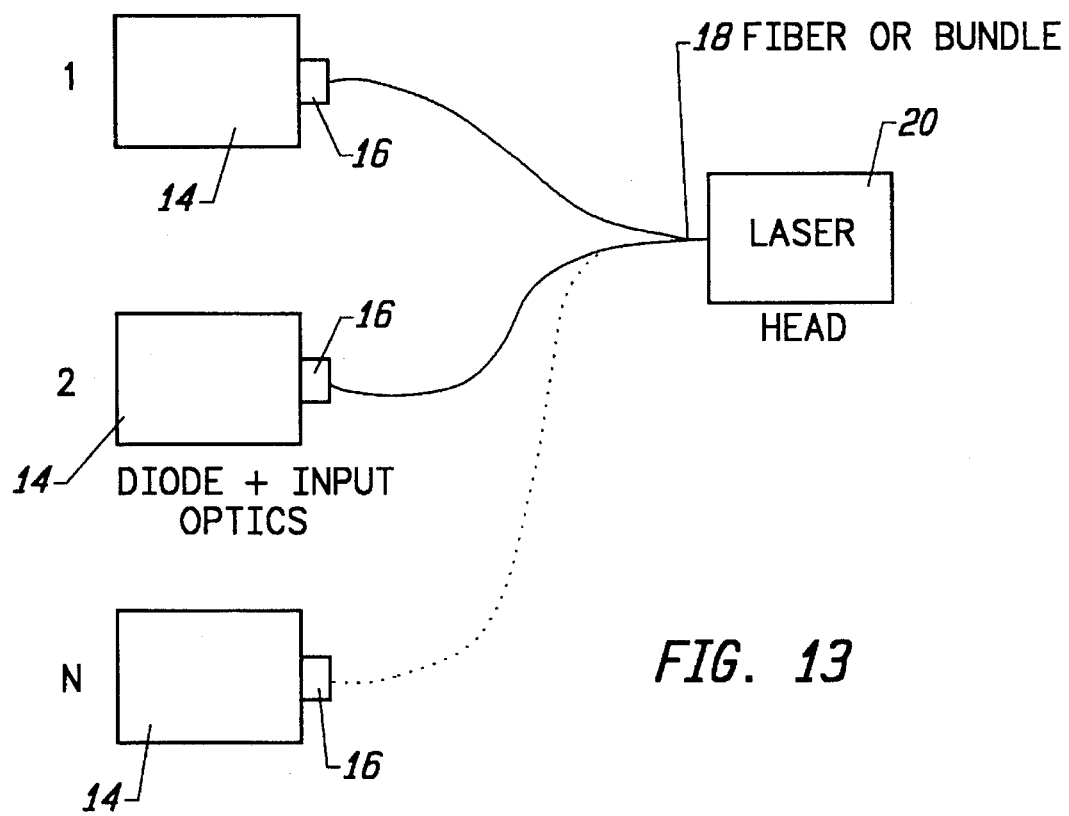
FIG. 13 is a perspective view of a plurality of diode sources with independent output beams that are all coupled into a multifurbricated fiber.

Referring now to FIG. 13, a plurality of laser diode pump sources 14 with associated input optics 16, each produce a distinct polarized output beam. This plurality of polarized output beams is combined into a multifurbricated fiber 18 and is coupled to laser head 20. A single depolarized output beam is incident on laser gain medium 24. The polarizations of the various laser diode pump sources are arranged such that their sum, incident of the laser gain medium is depolarized.

Figure 14:
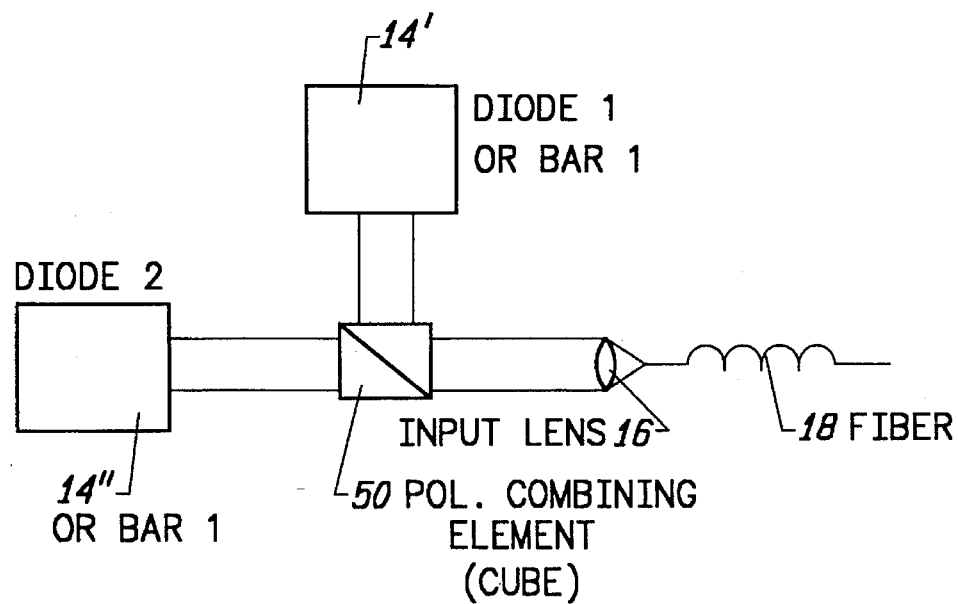
FIG. 14 is a perspective view of two diode sources each producing an independent output beam incident on a face of a polarization combining element which combines the two beams into a single output beam.

As shown in FIG. 14, laser diode pump source 14, which need not be of equal power but each having substantially equal wavelength, comprises first and second laser diode pump sources 14' and 14". Their output beams have orthogonal polarizations, substantially equal output powers and wavelengths. These two output beams are combined in a polarization combining element 50, and focused by input optics 16 into optical fiber 18. Polarization combining element 50 can be a cube, or other combination of polarization selective elements.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A laser or laser amplifier apparatus, comprising:
    a diode pump source producing a polarized pump beam;
    an optical fiber coupled to the diode pump source;
    a depolarization device configured to receive one of the polarized pump beam or an optical fiber delivered pump beam and produce a depolarized pump beam, wherein the depolarization device reduces a sensitivity of the laser or laser amplifier apparatus to one of a polarization rotation or a partial depolarization effect created by the optical fiber; and
    a laser head including a polarization dependent absorption gain medium pumped by the depolarized pump beam and generating an output beam.

2. The apparatus of claim 1, further comprising:
    beam shaping optics positioned adjacent to an emitter region of the diode pump source facilitating focus ability of the pump beam into one of an optical fiber.

3. The apparatus of claim 1, wherein the diode pump source is a diode bar.

4. The apparatus of claim 1, wherein the diode pump source is a single emitter.

5. The apparatus of claim 1, wherein the diode pump source is a broad stripe emitter.

6. The apparatus of claim 1, wherein the optical fiber has a length of ten meters or less.

7. The apparatus of claim 1, wherein the optical fiber has a length of six meters or less.

8. The apparatus of claim 1, wherein the optical fiber has a length of two meters or less.

9. The apparatus of claim 1, wherein the laser gain medium is made of all anisotropic material.

10. A laser or laser amplifier apparatus, comprising:
    a diode pump source producing a polarized pump beam;
    an optical fiber coupled to the diode pump source;
    a laser head including a polarization dependent absorption gain medium pumped by a depolarized pump beam and generate an output beam; and
    a depolarization device configured to receive one of the polarized pump beam or an optical fiber delivered pump beam and produce the depolarized pump beam, wherein the depolarization device reduces a sensitivity of the laser or laser amplifier apparatus to one of a polarization rotation or a partial depolarization effect created by the optical fiber, and the depolarization device is coupled to one of the diode pump source, the laser head or the optical fiber and produce a depolarized pump beam.

11. The apparatus of claim 10, wherein the depolarization device is positioned between an input end of one of the optical fiber and the diode pump source.

12. The apparatus of claim 10, wherein the depolarization device is positioned along a length of one of the optical fiber.

13. The apparatus of claim 10, wherein the depolarization device is positioned between an output end of one of the optical fiber and the laser gain medium.

14. The apparatus of claim 10, wherein the depolarization device provides a varying polarization across the pump beam.

15. The apparatus of claim 10, wherein the diode source is a diode bar.

16. The apparatus of claim 10, wherein the diode source is a single emitter.

17. The apparatus of claim 10, wherein the diode source is a broad stripe emitter.

18. The apparatus of claim 10, wherein the depolarization device is a birefringent wedge positioned to provide a varying polarization across the pump beam.

19. The apparatus of claim 10, wherein the depolarization device is two wedges in a contacting relationship.

20. The apparatus of claim 10, wherein the depolarization device is a birefringent fiber lens.

21. The apparatus of claim 10, wherein the depolarization device is a loop of optical fiber.

22. The apparatus of claim 10, wherein the depolarization device is a locally stressed region of the optical fiber.

23. The apparatus of claim 10, wherein the depolarization device is a knot of the optical fiber.

24. The apparatus of claim 10, wherein the depolarization device is a braided optical fiber.

25. The apparatus of claim 10, wherein the depolarization device is a wedge or prism possessing optical activity oriented to produce spatially varying polarization rotation.

26. A laser or laser amplifier apparatus, comprising:

a diode pump source producing a polarized pump beam;

an optical fiber coupled to the diode pump source and delivering the pump beam to the laser head, wherein the optical fiber has a geometry which changes the polarized pump beam to a depolarized pump beam and reduces one of a polarization rotation or a partial depolarization effect of the optical fiber; and a laser head including a polarization dependent absorption gain medium pumped by the depolarized pump beam and generate an output beam.

27. The apparatus of claim 26, wherein the beam combining device includes a telescope arrangement of optical elements positioned between the gain medium and an output end of one of the optical fiber.

28. The apparatus of claim 26, where the diode source is a diode bar.

29. The apparatus of claim 26, wherein the diode source is a single emitter.

30. The apparatus of claim 26, wherein the diode source is a broad stripe emitter.

31. The apparatus of claim 26, wherein the optical fiber has a length of ten meters or less.

32. The apparatus of claim 26, wherein the optical fiber has a length of six meters or less.

33. The apparatus of claim 26, wherein the optical fiber has a length of two meters or less.

34. The apparatus of claim 26, wherein the laser gain medium is made of an anisotropic material.

35. The apparatus of claim 26, wherein one of the optical fiber provides a varying polarization across the pump beam.

36. The apparatus of claim 26, wherein the diode source is a plurality of diode sources each producing a pump beam with a different polarization but with substantially equal wavelength, wherein the pump beams are individually focussed into a different input ends of one of a multifurcated fiber.

37. The apparatus of claim 36, wherein the pump beams have substantially equal power.

38. The apparatus of claim 36, further comprising:

a telescope arrangement of optical elements positioned between the apparatus gain medium and an output end of one of the optical fiber or bundle.

39. The apparatus of claim 36, wherein the depolarization device is positioned within the telescope arrangement.

40. The apparatus of claim 36, where the diode source is a diode bar.

41. The apparatus of claim 36, wherein the diode source is a single emitter.

42. The apparatus of claim 36, wherein the diode source is a broad stripe emitter.

43. The apparatus of claim 36, wherein the optical fiber has a length of ten meters or less.

44. The apparatus of claim 36, wherein the optical fiber has a length of six meters or less.

45. The apparatus of claim 36, wherein the optical fiber has a length of two meters or less.

46. The apparatus of claim 36, wherein the laser gain medium is made of anisotropic material.

47. A laser or laser amplifier apparatus, comprising:

a first diode pump source producing a first polarized pump beam with a first polarization direction;

a second diode pump source producing a second polarization pump beam with a second polarization direction that is different from the first polarization direction;

a beam combining device configured to combine the first and second polarized pump beams and produce a depolarized pump beam;

an optical fiber coupled to the first and second diode pump sources; and a laser head including a polarization dependent absorption gain medium pumped by the depolarized pump beam and generate an output beam.

48. The apparatus of claim 47, wherein the first and second pump beams have substantially equal power outputs.

49. The apparatus of claim 48, wherein the first and second pump beams have substantially equal wavelengths.

50. The apparatus of claim 47, wherein the beam combining device includes one or more polarization selective mirrors.

51. The apparatus of claim 47, wherein the beam combining device includes a telescope arrangement of optical elements.

52. The apparatus of claim 47, wherein the beam combining device is portioned between the first and second diode pump sources and all input end of the optical fiber.

53. The apparatus of claim 47, wherein the beam combining device is portioned between an output end of the optical fiber and the gain medium.

54. A laser or laser amplifier apparatus, comprising:

a first diode pump source producing a first polarized pump beam with a first polarization direction;

a second diode pump source producing a second polarization pump beam with a second polarization direction that is different from the first polarization direction;

a laser head including a polarization dependent absorption gain medium pumped by a depolarized pump beam and generating an output beam; and a telescope arrangement of optical elements positioned between the gain medium and an output end of the optical fiber configured to combine the first and second polarized pump beams and produce a depolarized pump beam.

* * * * *